United States Patent
Park et al.

(10) Patent No.: US 12,191,492 B2
(45) Date of Patent: Jan. 7, 2025

(54) ANODE FOR LITHIUM SECONDARY BATTERY AND LITHIUM SECONDARY BATTERY INCLUDING THE SAME

(71) Applicant: SK On Co., Ltd., Seoul (KR)

(72) Inventors: So Hyun Park, Daejeon (KR); Kyung Hoon Kim, Daejeon (KR); Chan Young Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/464,619

(22) Filed: Sep. 11, 2023

(65) Prior Publication Data
US 2024/0105944 A1 Mar. 28, 2024

(30) Foreign Application Priority Data
Sep. 27, 2022 (KR) .................. 10-2022-0122111

(51) Int. Cl.
| | |
|---|---|
| *H01M 4/587* | (2010.01) |
| *H01M 4/02* | (2006.01) |
| *H01M 4/133* | (2010.01) |
| *H01M 4/36* | (2006.01) |
| *H01M 10/052* | (2010.01) |

(52) U.S. Cl.
CPC .......... *H01M 4/587* (2013.01); *H01M 4/133* (2013.01); *H01M 4/364* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2012/0219863 A1* | 8/2012 | Takahashi | H01M 4/587 429/231.8 |
| 2022/0102700 A1* | 3/2022 | Ma | H01M 4/1393 |
| 2023/0290930 A1* | 9/2023 | Piao | H01M 10/052 |

FOREIGN PATENT DOCUMENTS

| | | | |
|---|---|---|---|
| EP | 3086392 B1 | 12/2018 | |
| EP | 4020651 A1 | 6/2022 | |
| JP | WO2014024473 A1 * | 2/2014 | |
| KR | 1020150027167 A | 3/2015 | |
| KR | 101591698 B1 | 2/2016 | |
| KR | 1020200085587 A | 7/2020 | |
| KR | 1020210037657 A | 4/2021 | |
| KR | 1020220034586 A | 3/2022 | |
| WO | 2016018023 A1 | 2/2016 | |
| WO | WO-2023121247 A1 * | 6/2023 | |

* cited by examiner

*Primary Examiner* — Robert S Carrico
(74) *Attorney, Agent, or Firm* — The Webb Law Firm

(57) ABSTRACT

An anode active material for a secondary battery according to an embodiment of the present disclosure includes an anode current collector, and an anode active material layer on at least one surface of the anode current collector. The anode active material layer includes an anode active material that includes a natural graphite and an artificial graphite. The artificial graphite has a form of single particles. An orientation index expressed as I(004)/I(110) is 15 or less.

9 Claims, 1 Drawing Sheet

ANODE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2022-0122111 filed Sep. 27, 2022, the disclosure of which is hereby incorporated by reference in its entirety.

BACKGROUND OF THE INVENTION

1. Field of the Invention

The disclosure of the present application relates to an anode for a lithium secondary battery and a lithium secondary battery including the same.

2. Description of Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery has been developed and applied as a power source for an eco-friendly vehicle such as an electric vehicle.

Examples of the secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

Recently, as an application range of the lithium secondary battery is expanded, anode materials having higher energy density and cost-efficiency has been researched. For example, artificial graphite and natural graphite may be used as an anode active material.

SUMMARY OF THE INVENTION

According to an aspect of the present disclosure, there is provided an anode for a lithium secondary battery having improved operational stability.

According to an aspect of the present disclosure, there is provided a lithium secondary battery having improved operational stability.

An anode for a lithium secondary battery and the lithium secondary battery of the present disclosure can be widely applied in green technology fields such as an electric vehicle, a battery charging station, a solar power generation using a battery, a wind power generation, etc. An anode for a lithium secondary battery and the lithium secondary battery of the present disclosure can be used in eco-friendly electric vehicle, hybrid vehicle, etc., to prevent climate change by suppressing an air pollution and a greenhouse gas emission.

An anode for a lithium secondary battery includes an anode current collector, and an anode active material layer on at least one surface of the anode current collector. The anode active material layer includes an anode active material that includes a natural graphite and an artificial graphite. The artificial graphite has a form of single particles. An orientation index defined by Equation 1 is 15 or less.

$$\text{Orientation Index} = I(004)/I(110) \quad \text{[Equation 1]}$$

In Equation 1, I(004) is a peak intensity of a (004) plane of the anode active material layer measured by an X-ray diffraction (XRD) analysis, and I(110) is a peak intensity of a (110) plane of the anode active material layer measured by the XRD analysis.

In some embodiments, a content of the artificial graphite may be in a range from 60 wt % to 80 wt % based on a sum of weights of the artificial graphite and the natural graphite.

In some embodiments, the orientation index may be in a range from 5 to 13.

In some embodiments, an irregularity degree defined by Equation 2 of the artificial graphite may be in a range from 1.7 to 2.2.

$$\text{Irregularity Degree} = Da/D50 \quad \text{[Equation 2]}$$

In Equation 2, Da is a value (μm) obtained by dividing a circumference of the artificial graphite measured by a particle size analyzer by π, and D50 is a volume average particle diameter (μm) of the artificial graphite.

In some embodiments, D50 in Equation 2 may be in a range from 3 μm to 10 μm.

In some embodiments, Da in Equation 2 is may be a range from 10 μm to 16 μm.

In some embodiments, a volume average particle diameter (D50) of the natural graphite is in a range from 3 μm to 15 μm.

In some embodiments, a carbon coating may cover at least a portion of a surface of at least one of the artificial graphite and the natural graphite.

In some embodiments, a thickness change ratio defined by Equation 3 may be in a range from 2% to 9%.

$$\text{Thickness Change Ratio (\%)} = \{(T1-T2)/(T2-T3)\}*100 \quad \text{[Equation 3]}$$

In Equation 3, T1 is a thickness of the anode for a lithium secondary battery when in a fully charged state, T2 is a thickness of the anode for a lithium secondary battery in a fully discharged state, and T3 is a thickness of the anode current collector.

A lithium secondary battery includes a cathode, and the anode for a lithium secondary battery according to the above-described embodiments facing the cathode.

According to embodiments of the present disclosure, a side reaction between an anode active material and an electrolyte may be suppressed and life-span properties may be improved.

According to embodiments of the present disclosure, an isotropy of anode active material particles may be increased, so that concentration of expansion of the anode active material particles in a specific direction during charging and discharging may be suppressed. Accordingly, a swelling phenomenon of the anode for a lithium secondary battery may be prevented, and operational stability of the lithium secondary battery may be improved.

According to embodiments of the present disclosure, the artificial graphite may have unevenness or protrusions in an appropriate degree to suppress expansion of the anode during charging, and packing efficiency of the anode active material may be improved. Accordingly, the life-span properties may be improved and swelling of the anode may be reduced.

DESCRIPTION OF THE INVENTION

Figure 1:
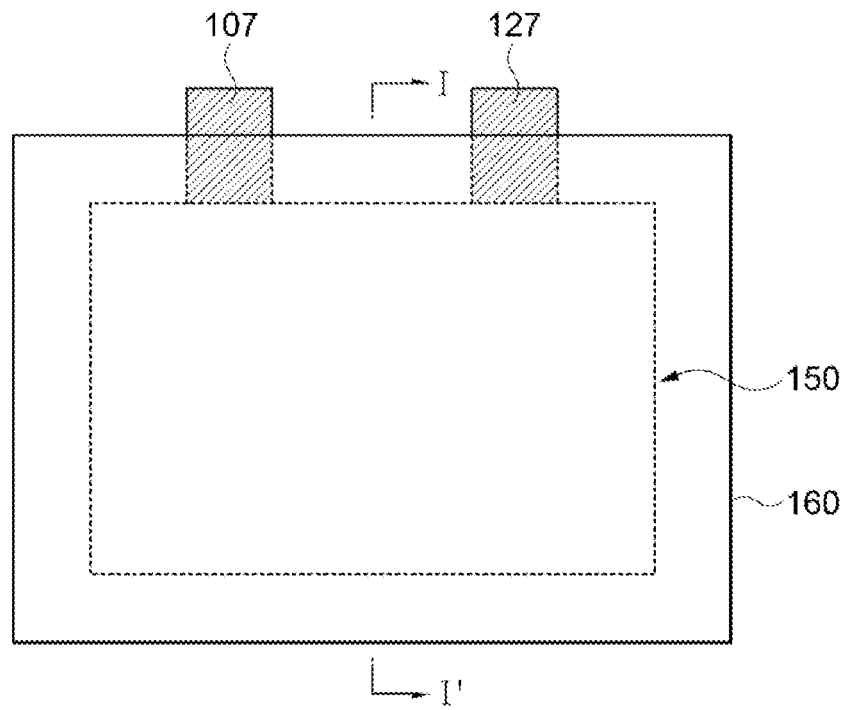
FIGS. 1 and 2 are a schematic plan view and a schematic cross-sectional view illustrating a secondary battery in accordance with example embodiments.

According to embodiments of the present disclosure, an anode for a lithium secondary battery including an artificial graphite and a natural graphite. Further, a lithium secondary battery including the anode is provided.

Hereinafter, detailed descriptions of the present disclosure will be described in detail with reference to example embodiments. However, those skilled in the art will appreciate that such embodiments are provided to further understand the spirit of the present inventive concepts do not limit subject matters to be protected as disclosed in the detailed description and appended claims.

According to embodiments of the present disclosure, an anode for a lithium secondary battery (hereinafter, that may be abbreviated as "an anode") includes an anode current collector and an anode active material layer formed on at least one surface of the anode current collector. The anode active material layer may include an anode active material for a lithium secondary battery.

According to embodiments of the present disclosure, the anode active material for a lithium secondary battery (hereinafter, that may be abbreviated as "an anode active material") includes an artificial graphite and a natural graphite.

The artificial graphite may have a shape of a single particle. For example, the artificial graphite may include a plurality of artificial graphite particles each having the shape of the single particle.

The term "single particle" as used herein is used to exclude a secondary particle formed by aggregation of a plurality of primary particles. For example, the artificial graphite may substantially consist of particles in the form of the single particle, and the secondary particle structure in which the primary particles are assembled or aggregated may be excluded.

In some embodiments, the artificial graphite may include a structure in which a plurality of primary particles are integrally merged into a substantially single particle.

For example, the artificial graphite may have a granular type or a spherical type of the single particle.

For example, the artificial graphite having the shape of the single particle is included in the anode active material, so that a side reaction with an electrolyte may be suppressed and cost-efficiency may be enhanced. Accordingly, life-span properties and economic feasibility of the anode active material may be improved.

For example, the natural graphite having low hardness and high capacity may be included in the anode active material, so that cracks of the anode active material may be prevented during being pressed, and high capacity properties of the lithium secondary battery may be implemented.

In some embodiments, an amount of the artificial graphite based on a sum of weights of the artificial graphite and the natural graphite may be in a range from 60 weight percent (wt %) to 80 wt %. Within this range, the life-span properties of the anode active material may be improved while preventing cracks, and the capacity properties of the lithium secondary battery may be improved.

In example embodiments, the anode may have an orientation index defined by Equation 1 below of 15 or less. In some embodiments, the orientation index may be in a range from 5 to 13.

Orientation Index=$I(004)/I(110)$ [Equation 1]

In Equation 1, I(004) is a peak intensity of a (004) plane of the anode active material layer measured by an X-ray diffraction (XRD) analysis, and I(110) is a peak intensity of a (110) plane of the anode active material layer measured by the XRD analysis.

The term "peak intensity" used herein refers to a peak height in an XRD analysis graph in which a horizontal axis is a diffraction angle (2θ) and a vertical axis is a peak intensity.

For example, the orientation index may represent a degree of orientation of anode active material particles in a specific direction. For example, as the orientation index becomes greater, a degree of isotropy of the anode active material particles may become low. As the orientation index becomes lower, the degree of isotropy of the anode active material particles may be increased.

Within the orientation index range, the isotropy of the anode active material particles may be increased, and concentration of expansion of the anode active material particles in a specific direction during charging and discharging may be suppressed. Accordingly, a swelling phenomenon of the anode may be prevented, and operational stability of the lithium secondary battery may be improved.

For example, the orientation index may be obtained by performing the XRD analysis on the anode active material layer formed by coating, drying and pressing an anode slurry that included the anode active material on the anode current collector.

The anode slurry may include, e.g., the anode active material, a conductive material, a binder, etc.

In some embodiments, the above-described artificial graphite may have an irregularity (unevenness or protrusion) degree defined by Equation 2 below of 1.7 to 2.2.

Irregularity Degree=$Da/D50$ [Equation 2]

In Equation 2, Da is a value (μm) obtained by dividing a circumference of the artificial graphite measured through a particle size analyzer by π, and D50 is a volume average particle diameter (μm) of the artificial graphite.

For example, Da in Equation 2 may be a diameter of a circle when a shape of the artificial graphite is assumed to be a circle having the same circumference as the measured circumference after measuring the circumference of the artificial graphite by the particle shape analyzer.

As the number of irregularities of the artificial graphite increases or a scale of the irregularities increases, the circumference of the artificial graphite increases so that Da may be increased. As the number of the irregularities of the artificial graphite decreases or the scale of the irregularities become smaller, the circumference of the artificial graphite decreases so that Da may be decreased.

For example, a 2D image of the artificial graphite may be obtained from the particle shape analyzer, and the circumference of the artificial graphite may be measured from the 2D image. For example, Da may be obtained assuming that the measured circumference is πDa.

D50 in Equation 2 may be defined as a particle diameter (volume average particle diameter) when a volume cumulative percentage corresponds to 50% in a particle size distribution (PSD) obtained from a particle volume.

The irregularity degree may represent, e.g., a degree of sphericity of the artificial graphite particles. For example, as the irregularity degree becomes smaller, the artificial graphite particle may be close to a spherical shape. As the irregularity degree becomes greater, a large number of uneven portions or protrusions may be included in the artificial graphite particle.

Within the range of the irregularity degree, an appropriate number of the uneven portions or the protrusions may be formed on the artificial graphite, so that expansion of the anode during charging may be suppressed and packing efficiency of the anode active material may be improved. Accordingly, the life-span properties may be improved and swelling of the anode may be avoided or reduced.

In some embodiments, the volume average particle diameter (D50) of the artificial graphite may be in a range from 3 μm to 10 μm. In some embodiments, D50 of the artificial graphite may be in a range from 5 μm to 8 μm. Within the above range, the side reactions with the electrolyte may be suppressed while reducing volume expansion of the artificial graphite during charging. Additionally, an excessive increase (e.g., greater than 15) of the orientation index of the anode active material may be prevented within the above range.

In some embodiments, Da in Equation 2 may be in a range from 10 μm to 16 μm, and may be in a range from 13 μm to 15 μm in some embodiments. Within the above range, deterioration in packing efficiency or spatial efficiency of the anode active material may be prevented while maintaining appropriate irregularities or protrusions of the artificial graphite particles.

For example, the irregularity degree may be adjusted to a range from 1.7 to 2.2 by controlling both Da and D50 of the artificial graphite.

The natural graphite may include a plurality of natural graphite particles. In some embodiments, a volume average particle diameter (D50) of the natural graphite may be in a range from 3 μm to 15 μm, and may be in a range from 8 μm to 13 μm in some embodiments. Within this range, excessive expansion may be suppressed while reducing a hardness of the anode active material.

In some embodiments, the anode active material may further include a carbon coating covering at least a portion of a surface of at least one of the artificial graphite and the natural graphite. Accordingly, the surface of the anode active material particle may be protected, and a capacity retention of the lithium secondary battery may be improved.

In one embodiment, the carbon coating may include an amorphous carbon. For example, the carbon coating may include hard carbon, soft carbon, calcined coke or a mesophase pitch carbide.

In some embodiments, a thickness change ratio defined by Equation 3 below of the anode may be in a range from 2% to 9%. In some embodiments, the thickness change ratio of the anode may be in a range from 3% to 8%.

$$\text{Thickness Change Ratio (\%)} = \{(T1-T2)/(T2-T3)\}*100 \quad \text{[Equation 3]}$$

In Equation 3, T1 is a thickness of the anode for a lithium secondary battery in a state of being fully charged, T2 is a thickness of the anode for a lithium secondary battery in a state of being fully discharged, and T3 is a thickness of the current collector of the anode. The state of being fully charged may refer to a maximum charged state, and the state of being full discharged may refer to a minimum charged state (e.g., a maximum discharged state) of the lithium secondary battery.

T1, T2 and T3 represent lengths in a thickness direction perpendicular to an extension direction of the anode active material layer and the anode current collector.

As expressed by Equation 3, the thickness change ratio is calculated as a percentage by dividing a difference between the anode thickness T1 at the fully charged state and the anode thickness T2 at the fully discharged state by the thickness (T2−T3) of the anode active material layer at the full discharged state.

The thickness T3 of the anode current collector may be substantially constant, and thus the difference between the anode thickness T1 at the fully charged state and the anode thickness T2 at the fully discharged state may be substantially the same as a difference of thicknesses of the anode active material between the fully charged state and the fully discharged state.

Within the range of the thickness change ratios, swelling of the anode may be suppressed, and operational stability and life-span properties of the lithium secondary battery may be improved.

Figure 2:
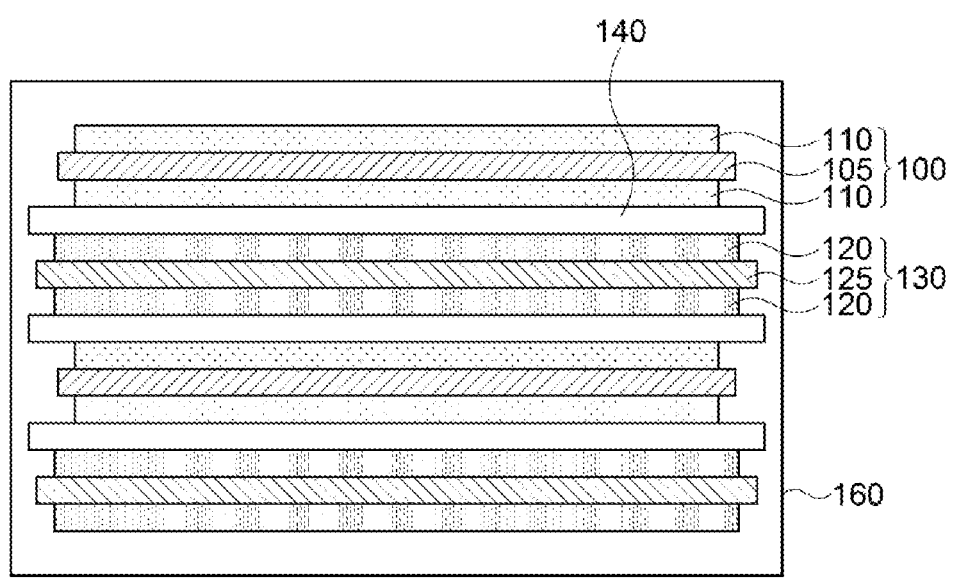

FIGS. 1 and 2 are a schematic plan view and a schematic cross-sectional view, respectively, illustrating a secondary battery according to example embodiments. For example, FIG. 2 is a cross-sectional view taken along a line I-I' in FIG. 1 in a thickness direction of the lithium secondary battery.

Referring to FIGS. 1 and 2, a lithium secondary battery may include an electrode assembly including an anode 130, a cathode 100 and a separation layer 140 interposed between the cathode and the anode. The electrode assembly may be accommodated and impregnated with an electrolyte in a case 160.

The cathode 100 may include a cathode active material layer 110 formed by coating, drying and pressing a mixture containing a cathode active material on at least one surface of a cathode current collector 105.

The cathode current collector 105 may include aluminum, stainless steel, nickel, titanium, or an alloy thereof, or aluminum or stainless steel surface-treated with carbon, nickel, titanium, silver, etc.

The cathode active material may include a compound capable of reversibly intercalating and de-intercalating lithium ions.

In example embodiments, the cathode active material may include a lithium-transition metal oxide. For example, the lithium-transition metal oxide includes nickel (Ni) and may further include at least one of cobalt (Co) and manganese (Mn).

For example, the lithium-transition metal oxide may be represented by Chemical Formula 1 below.

$$Li_xNi_{1-y}M_yO_{2+z} \quad \text{[Chemical Formula 1]}$$

In Chemical Formula 1, $0.9 \leq x \leq 1.2$, $0 \leq y \leq 0.7$, and $-0.1 \leq z \leq 0.1$. M may include at least one element selected from Na, Mg, Ca, Y, Ti, Zr, Hf, V, Nb, Ta, Cr, Mo, W, Mn, Co, Fe, Cu, Ag, Zn, B, Al, Ga, Sn and Zr.

In some embodiments, a molar ratio or a concentration (1−y) of Ni in Chemical Formula 1 may be greater than or equal to 0.8, and may exceed 0.8 in some embodiments.

A cathode mixture may be prepared by mixing and stirring the cathode active material in a solvent with a binder, a conductive material and/or a dispersive agent. The cathode mixture may be coated on at least one surface of the cathode current collector 105, and then dried and pressed to form the cathode 100.

The solvent may include a non-aqueous solvent. For example, N-methyl-2-pyrrolidone (NMP), dimethylformamide, dimethylacetamide, N,N-dimethylaminopropylamine, ethylene oxide, tetrahydrofuran, etc., may be used.

For example, the binder may include an organic based binder such as a vinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be included to promote an electron movement between active material particles. For example, the conductive material may include a carbon-based conductive material such as graphite, carbon black, graphene, carbon nanotube, etc., and/or a metal-based conductive material such as tin, tin oxide, titanium oxide, a perovskite material such as $LaSrCoO_3$, $LaSr_4MnO_3$, etc.

In example embodiments, an anode slurry may be prepared from the above-described anode active material including the artificial graphite and the natural graphite. For example, the anode slurry may be prepared by mixing and stirring the anode active material with an anode binder, a conductive material and a thickener in a solvent.

For example, the solvent included in the anode slurry may be an aqueous solvent such as water, an aqueous hydrochloric acid solution, an aqueous sodium hydroxide solution, etc.

For example, the anode binder may include a polymer material such as styrene-butadiene rubber (SBR). Examples of the thickener include carboxymethyl cellulose (CMC).

For example, the conductive material may include a material of the same type as that of the above-described conductive material included in the cathode active material layer.

In some embodiments, the anode 130 may include an anode active material layer 120 formed by applying (coating) the above-described anode slurry on at least one surface of an anode current collector 125 and then drying and pressing the anode slurry.

For example, the anode current collector 125 may include stainless steel, nickel, copper, titanium, an alloy thereof, or copper or stainless steel surface-treated with carbon, nickel, titanium or silver.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, etc. The separation layer 140 may be also formed from a non-woven fabric including a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, e.g., precipitation or sedimentation. Thus, improvements of capacity and power of the lithium secondary battery from using the anode active material according to embodiments of the present disclosure may be effectively implemented.

In example embodiments, an electrode cell may be defined by the cathode 100, the anode 130 and the separation layer 140, and a plurality of the electrode cells may be stacked to form the electrode assembly 150 having, e.g., a jelly roll shape. For example, the electrode assembly 150 may be formed by winding, stacking or folding of the separation layer 140.

The electrode assembly 150 may be accommodated together with an electrolyte in the case 160 to define the lithium secondary battery. In example embodiments, a non-aqueous electrolyte may be used as the electrolyte.

For example, the non-aqueous electrolyte may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Hereinafter, preferred embodiments are proposed to more concretely describe the present disclosure. However, the following examples are only given for illustrating the present disclosure and those skilled in the related art will obviously understand that various alterations and modifications are possible within the scope and spirit of the present disclosure. Such alterations and modifications are duly included in the appended claims.

Example 1

Preparation of Anode Active Material

An anode active material was prepared by mixing an artificial graphite having the form of a single particle and a volume average particle diameter (D50) of 7 μm and a natural graphite having a volume average particle diameter (D50) of 10 μm in a weight ratio of 7:3.

Specifically, coke was pulverized to have D50 of 7 μm, and then graphitized at 3000° C. or higher. Thereafter, a fine powder and a coarse powder were removed by a classification to prepare an artificial graphite in the form of a single particle having D50 of 7 μm, and then mixed with a natural graphite having D50 of 10 μm in the above-described ratio to prepare an anode active material.

Fabrication of Anode

An anode slurry was prepared by mixing 90 wt % of the anode active material, 3 wt % of styrene-butadiene rubber (SBR) as a binder, 2 wt % of Super C as a conductive material and 5 wt % of carboxymethyl cellulose (CMC) as a thickener.

The anode slurry was coated on a copper substrate having a thickness of 8 μm, and then dried and pressed to prepare an anode.

Fabrication of Lithium Half Cell (Li-Half Cell)

A lithium half-cell including the above-prepared anode and using a lithium metal as a counter electrode (cathode) was manufactured.

Specifically, a lithium coin half-cell was constructed by interposing a separator (polyethylene, thickness of 20 μm) between the above-prepared anode and the lithium metal (thickness of 1 mm).

The assembly of the lithium metal/separator/anode was placed in a coin cell plate, an electrolyte was injected, and then a cap was covered and clamped. In a preparation of the electrolyte, a 1.0 M $LiPF_6$ solution was prepared using a mixed solvent of EC/EMC (3:7; volume ratio), and 2.0 vol % of FEC was added based on a total volume of the electrolyte. After impregnation for 3 to 24 hours after clamping, 3 cycles of charging and discharging at 0.1 C were performed (charging condition: CC-CV 0.1 C 0.01V 0.01 C CUT-OFF, discharging condition: CC 0.1 C 1.5V CUT-OFF).

Examples 2 to 12 and Comparative Examples 1 to 5

Anode active materials, anodes and lithium half-cells were prepared by the same method as that in Examples 1, except that D50, Da and irregularity degree of the artificial graphite, D50 of the natural graphite, and a content of the artificial graphite based on a total weight of the artificial graphite and the natural graphite were adjusted as shown in Table 2 below.

Comparative Example 6

An anode active material, an anode and a lithium half-cell were prepared by the same manner as that in Example 1, except that artificial graphite having a secondary particle form formed by aggregation of primary particles was used instead of the artificial graphite having the single particle form.

Experimental Example (1) Measure of Orientation Index of Anode Active Material

An XRD analysis was performed on each anode active material layer included in the anode prepared according to each of Examples and Comparative Examples to measure peak intensities I(004) and I(110) corresponding to a (004) plane and a (110) plane, respectively.

I(004) was a maximum value of a peak intensity in a range of a diffraction angle (2θ) from 53.5° to 56.0°, and I(110) was a maximum value of a peak intensity in a range of a diffraction angle (2θ) from 76.5° to 78.5°.

The measured I(004) and I(110) were substituted into Equation 1 as described above to obtain an orientation degree.

Specific XRD analysis equipment and conditions are as shown in Table 1 below.

TABLE 1

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

(2) Measure of Irregularity Degree of Artificial Graphite

1) Measurement of Da

The artificial graphite prepared according to each of Examples and Comparative Examples was assumed as being spherical particles, and an average diameter was obtained.

Specifically, a 2D image of the artificial graphite was obtained by a particle shape analyzer (Microtrac SYNC, Dream Corporation), a circumference of the artificial graphite was measured from the 2D image, and Da was measured by dividing the circumference by π.

2) Measurement of D50

A particle size distribution (PSD) graph was obtained using a particle size analyzer (LA 950V2, Horiba Co.) for the artificial graphite powder prepared according to each of Examples and Comparative Examples, and a particle diameter at a volume cumulative percentage in the graph corresponding to 50% was determined as D50.

3) Calculation of Irregularity Degree

An irregularity degree of the artificial graphite was calculated by substituting the measured Da and D50 into Equation 2 above.

Table 2 below shows the particle size (D50, Da) of the anode active material, the irregularity degree, the orientation index and the content of the artificial graphite based on the total weight of the anode active material.

TABLE 2

| | | artificial graphite | | | natural graphite | | content of artificial |
|---|---|---|---|---|---|---|---|
| No. | particle shape | D50 (μm) | Da (μm) | irregularity degree | D50 (μm) | orientation degree | graphite (wt %) |
| Example 1 | single particle | 7 | 13.3 | 1.90 | 10 | 9.8 | 70 |
| Example 2 | single particle | 8 | 14.1 | 1.76 | 10 | 11.1 | 70 |
| Example 3 | single particle | 9 | 15.8 | 1.76 | 10 | 13.6 | 70 |

TABLE 2-continued

| No. | artificial graphite particle shape | artificial graphite D50 (μm) | artificial graphite Da (μm) | artificial graphite irregularity degree | natural graphite D50 (μm) | natural graphite orientation degree | content of artificial graphite (wt %) |
|---|---|---|---|---|---|---|---|
| Example 4 | single particle | 7 | 13.3 | 1.90 | 13 | 12.8 | 70 |
| Example 5 | single particle | 8 | 14.1 | 1.76 | 13 | 13.9 | 70 |
| Example 6 | single particle | 6 | 10.0 | 1.67 | 10 | 9.3 | 70 |
| Example 7 | single particle | 8 | 16.8 | 2.10 | 10 | 10.2 | 70 |
| Example 8 | single particle | 9 | 20.1 | 2.23 | 10 | 12.8 | 70 |
| Example 9 | single particle | 2.5 | 5.2 | 2.08 | 10 | 4.7 | 70 |
| Example 10 | single particle | 10.2 | 17.4 | 1.71 | 10 | 14.8 | 70 |
| Example 11 | single particle | 7 | 13.3 | 1.90 | 10 | 10.5 | 55 |
| Example 12 | single particle | 7 | 13.3 | 1.90 | 10 | 8.9 | 85 |
| Comparative Example 1 | single particle | 11 | 16.9 | 1.54 | 15 | 15.7 | 70 |
| Comparative Example 2 | single particle | 12 | 18.2 | 1.52 | 15 | 19.5 | 70 |
| Comparative Example 3 | single particle | 15 | 19.7 | 1.31 | 15 | 21.5 | 70 |
| Comparative Example 4 | single particle | 15 | 19.7 | 1.31 | 10 | 18.7 | 70 |
| Comparative Example 5 | single particle | 17 | 23.3 | 1.37 | 10 | 22.1 | 70 |
| Comparative Example 6 | secondary particle | 10 | 16.4 | 1.61 | 10 | 14.8 | 70 |

Evaluation Example (1) Calculation of Thickness Change Ratio of Anode

1) Measurement of Thickness (T1) of Anode in Fully Charged State After fully charging (CC-CV 0.1 C, 0.01V 0.01 C CUT-OFF) the lithium half-cell prepared according to each of Examples and Comparative Examples, the lithium half-cell was disassembled and a thickness of the anode was measured.

2) Measurement of Thickness (T2) of Anode in Fully Discharged State

The lithium half-cell prepared according to each of Examples and Comparative Examples was fully charged (CC-CV 0.1 C, 0.01V 0.01 C CUT-OFF), and then completely discharged (CC 0.1 C, 1.5V CUT-OFF). Thereafter, the discharged lithium half-cell was disassembled and a thickness of the anode was measured.

3) Calculation of Thickness Change Ratio

The measured T1 and T2 and a thickness T3 (8 μm) of the copper substrate were substituted into Equation 3 above to calculate a thickness change ratio.

(2) Evaluation on Capacity Retention

A cycle of charge (CC-CV 0.5 C 0.01V 0.01 C CUT-OFF) and discharge (CC 0.5 C 1.5V CUT-OFF) at room temperature (25° C.) for each lithium half-cell according to Examples and Comparative Examples was performed 100 times to measure a discharge capacity. A 10-minute intermission was allowed between the cycles. A discharge capacity at the 100th cycle was divided by a discharge capacity at the 1st cycle to be expressed as a percentage.

The evaluation results are shown in Table 3 below.

TABLE 3

| No. | T1 (μm) | T2 (μm) | thickness change ratio (%) | capacity retention (100 cyc) (%) |
|---|---|---|---|---|
| Example 1 | 194 | 186 | 4.5 | 90.8 |
| Example 2 | 196 | 185 | 6.2 | 90.5 |
| Example 3 | 197 | 186 | 6.2 | 90.1 |
| Example 4 | 194 | 188 | 3.3 | 90.2 |
| Example 5 | 195 | 187 | 4.5 | 89.8 |
| Example 6 | 193 | 179 | 8.2 | 87.2 |
| Example 7 | 197 | 187 | 5.6 | 89.9 |
| Example 8 | 199 | 183 | 9.1 | 86.9 |
| Example 9 | 194 | 187 | 3.9 | 87.0 |
| Example 10 | 201 | 187 | 7.8 | 86.5 |
| Example 11 | 195 | 186 | 5.1 | 88.1 |
| Example 12 | 194 | 185 | 5.1 | 87.7 |
| Comparative Example 1 | 201 | 184 | 9.7 | 82.1 |
| Comparative Example 2 | 201 | 183 | 10.3 | 81.5 |
| Comparative Example 3 | 201 | 181 | 11.6 | 80.7 |
| Comparative Example 4 | 200 | 182 | 10.3 | 81.2 |
| Comparative Example 5 | 204 | 184 | 11.4 | 78.4 |
| Comparative Example 6 | 202 | 177 | 14.8 | 69.5 |

Referring to Table 3, in Examples including the artificial graphite in the form of the single particles and having the orientation index defined by Equation 1 of 15 or less, low thickness change ratios and high capacity retentions were achieved compared to those from Comparative Examples.

In Example 6 where the irregularity degree was less than 1.7, the artificial graphite particles were further closer to a sphere, and the thickness change ratio was relatively increased.

In Example 8 where the irregularity degree exceeded 2.2, the artificial graphite particles contained an increased amount of concavo-convex or protruding portions, and the thickness change ration was relatively increased.

In Example 9 where the volume average particle diameter (D50) of the artificial graphite was less than 3 μm, a side reaction with the electrolyte was relatively increased, and the capacity retention was relatively lowered.

In Example 10 where the artificial graphite had a D50 exceeding 10 μm, the thickness change ratio was relatively increased and the capacity retention was relatively decreased.

In Example 11 where the content of the artificial graphite in the form of single particles was less than 60 wt % based on the total weight of the anode active material, life-span properties were relatively degraded.

In Example 12 where the content of the artificial graphite in the form of the single particles exceeded 80 wt % based on the total weight of the anode active material, cracks of the anode active material particles were relatively increased, and the capacity retention was relatively lower.

What is claimed is:

1. An anode for a lithium secondary battery, comprising:
   an anode current collector; and
   an anode active material layer on at least one surface of the anode current collector, the anode active material layer comprising an anode active material that comprises a natural graphite and an artificial graphite, the artificial graphite having a form of single particles,
   wherein an orientation index defined by Equation 1 is 15 or less:

Orientation Index=I(004)/I(110)      [Equation 1]

wherein, in Equation 1, I(004) is a peak intensity of a (004) plane of the anode active material layer measured by an X-ray diffraction (XRD) analysis, and I(110) is a peak intensity of a (110) plane of the anode active material layer measured by the XRD analysis, and wherein an irregularity degree defined by Equation 2 of the artificial graphite is in a range from 1.7 to 2.2:

IrregularityDegree=Da/D50      [Equation 2]

where, in Equation 2, Da is a value (μm) obtained by dividing a circumference of the artificial graphite measured by a particle size analyzer by π, and D50 is a volume average particle diameter (μm) of the artificial graphite.

2. The anode for a lithium secondary battery according to claim 1, wherein a content of the artificial graphite is in a range from 60 wt % to 80 wt % based on a sum of weights of the artificial graphite and the natural graphite.

3. The anode for a lithium secondary battery according to claim 1, wherein the orientation index is in a range from 5 to 13.

4. The anode for a lithium secondary battery according to claim 1, wherein D50 in Equation 2 is in a range from 3 μm to 10 μm.

5. The anode for a lithium secondary battery according to claim 1, wherein Da in Equation 2 is in a range from 10 μm to 16 μm.

6. The anode for a lithium secondary battery according to claim 1, wherein a volume average particle diameter (D50) of the natural graphite is in a range from 3 μm to 15 μm.

7. The anode for a lithium secondary battery according to claim 1, further comprising a carbon coating covering at least a portion of a surface of at least one of the artificial graphite and the natural graphite.

8. The anode for a lithium secondary battery according to claim 1, wherein a thickness change ratio defined by Equation 3 is in a range from 2% to 9%:

Thickness Change Ratio (%)={(T1-T2)/(T2-T3)}*100 wherein, in Equation 3, T1 is a thickness of the anode for a lithium secondary battery when in a fully charged state, T2 is a thickness of the anode for a lithium secondary battery in a fully discharged state, and T3 is a thickness of the anode current collector.

9. A lithium secondary battery, comprising:
   a cathode; and
   the anode for a lithium secondary battery of claim 1 facing the cathode.

* * * * *